United States Patent
Gupta et al.

(10) Patent No.: US 11,284,329 B2
(45) Date of Patent: *Mar. 22, 2022

(54) DEVICE DETECTION IN MIXED STATIC AND MOBILE DEVICE NETWORKS

(71) Applicant: QUALCOMM Incorporated, San Diego, CA (US)

(72) Inventors: Piyush Gupta, Bridgewater, NJ (US); Tingfang Ji, San Diego, CA (US); Chong Li, Weehawken, NJ (US); Shailesh Patil, San Diego, CA (US); Joseph Binamira Soriaga, San Diego, CA (US); Jing Jiang, San Diego, CA (US); Wei Zeng, Saratoga, CA (US); Alexei Yurievitch Gorokhov, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 16/853,086

(22) Filed: Apr. 20, 2020

(65) Prior Publication Data

US 2020/0252857 A1     Aug. 6, 2020

Related U.S. Application Data

(63) Continuation of application No. 15/386,114, filed on Dec. 21, 2016, now Pat. No. 10,645,631.
(Continued)

(51) Int. Cl.
*H04W 40/24* (2009.01)
*H04W 8/00* (2009.01)
(Continued)

(52) U.S. Cl.
CPC ........ *H04W 40/246* (2013.01); *H04W 8/005* (2013.01); *H04W 64/006* (2013.01);
(Continued)

(58) Field of Classification Search
CPC ... H04W 8/005; H04W 40/24; H04W 40/246; H04W 48/08; H04W 28/0294;
(Continued)

(56) References Cited

U.S. PATENT DOCUMENTS 8,503,377 B2   8/2013   Cordeiro et al.
8,570,972 B2   10/2013  Laroia et al.
(Continued)

FOREIGN PATENT DOCUMENTS

CN   102202382 A   9/2011
CN   102404804 A   4/2012
(Continued)

OTHER PUBLICATIONS

Taiwan Search Report—TW106110450—TIPO—dated Jan. 4, 2021.
(Continued)

*Primary Examiner* — Ashley Shivers
(74) *Attorney, Agent, or Firm* — Norton Rose Fulbright LLP

(57) ABSTRACT

Device detection in networks with mixed mobility devices is discussed. Devices in the network first determine a discovery mode from a plurality of discovery modes, wherein the determining is based on a mobility state of the wireless device. The device identifies a set of resources associated with the determined discovery mode, wherein each of the plurality of discovery modes is provisioned with separate resources. A discovery signal is transmitted using the identified set of resources according to the discovery mode.
(Continued)

Thus, devices with higher mobility will generally send discovery signals more often than devices that are static or semi-static.

30 Claims, 9 Drawing Sheets

Related U.S. Application Data

(60) Provisional application No. 62/347,973, filed on Jun. 9, 2016.

(51) Int. Cl.
    *H04W 72/02* (2009.01)
    *H04W 74/08* (2009.01)
    *H04W 64/00* (2009.01)
    *H04W 92/18* (2009.01)

(52) U.S. Cl.
    CPC .......... *H04W 72/02* (2013.01); *H04W 74/08* (2013.01); *H04W 74/0825* (2013.01); *H04W 92/18* (2013.01)

(58) Field of Classification Search
    CPC ... H04W 74/04; H04W 74/08; H04W 64/006; H04W 72/02; H04W 74/0825; H04W 92/18
    See application file for complete search history.

(56) References Cited

U.S. PATENT DOCUMENTS

| | | | |
|---|---|---|---|
| 8,687,539 B2 | 4/2014 | Tay et al. | |
| 8,873,494 B2 | 10/2014 | Cherian et al. | |
| 9,936,508 B2 | 4/2018 | Gupta et al. | |
| 10,057,352 B2 | 8/2018 | Gupta et al. | |
| 10,476,964 B2 | 11/2019 | Gupta et al. | |
| 2009/0036052 A1 | 2/2009 | Miyanaga et al. | |
| 2009/0061767 A1 | 3/2009 | Horiuchi et al. | |
| 2009/0175324 A1 | 7/2009 | Sampath et al. | |
| 2010/0128565 A1 | 5/2010 | Golparian | |
| 2010/0177756 A1 | 7/2010 | Choi et al. | |
| 2011/0126188 A1 | 5/2011 | Bernstein et al. | |
| 2011/0249195 A1 | 10/2011 | Teranuma | |
| 2011/0256828 A1 | 10/2011 | Hsu et al. | |
| 2012/0039295 A1 | 2/2012 | Quan et al. | |
| 2012/0053742 A1 | 3/2012 | Tsuda | |
| 2012/0060024 A1 | 3/2012 | Jackson et al. | |
| 2012/0134395 A1 | 5/2012 | Varadarajan et al. | |
| 2012/0135677 A1 | 5/2012 | Hsu et al. | |
| 2012/0163235 A1 | 6/2012 | Ho et al. | |
| 2012/0218926 A1 | 8/2012 | Wang et al. | |
| 2013/0111044 A1 | 5/2013 | Cherian et al. | |
| 2013/0138989 A1 | 5/2013 | Jang et al. | |
| 2013/0188542 A1 | 7/2013 | Merlin et al. | |
| 2014/0023053 A1 | 1/2014 | Park et al. | |
| 2014/0031028 A1* | 1/2014 | Yamada | H04W 76/14 455/419 |
| 2014/0044036 A1 | 2/2014 | Kim et al. | |
| 2014/0056210 A1 | 2/2014 | Jafarian et al. | |
| 2014/0056220 A1 | 2/2014 | Poitau et al. | |
| 2014/0079218 A1 | 3/2014 | Cheng et al. | |
| 2014/0112162 A1 | 4/2014 | Tavildar et al. | |
| 2014/0133593 A1 | 5/2014 | Lim et al. | |
| 2014/0169290 A1 | 6/2014 | Seok | |
| 2014/0254429 A1 | 9/2014 | Wang et al. | |
| 2014/0372625 A1 | 12/2014 | Dureau | |
| 2015/0016359 A1 | 1/2015 | Wang et al. | |
| 2015/0029866 A1 | 1/2015 | Liao et al. | |
| 2015/0031353 A1 | 1/2015 | Hakola et al. | |
| 2015/0038188 A1 | 2/2015 | Gupta et al. | |
| 2015/0056987 A1 | 2/2015 | Li et al. | |
| 2015/0121470 A1 | 4/2015 | Rongo et al. | |
| 2015/0208332 A1 | 7/2015 | Baghel et al. | |
| 2015/0318942 A1 | 11/2015 | Jafarian et al. | |
| 2016/0057693 A1* | 2/2016 | Nagata | H04W 8/005 370/254 |
| 2016/0095074 A1 | 3/2016 | Park et al. | |
| 2016/0135168 A1* | 5/2016 | Liu | H04W 72/048 370/329 |
| 2016/0262090 A1* | 9/2016 | Marin | H04W 74/0816 |
| 2016/0330604 A1 | 11/2016 | Kim et al. | |
| 2017/0013640 A1 | 1/2017 | Loehr et al. | |
| 2017/0188312 A1* | 6/2017 | Wang | H04W 52/367 |
| 2017/0295554 A1* | 10/2017 | Lee | H04W 56/0025 |
| 2017/0295567 A1 | 10/2017 | Chen et al. | |
| 2017/0303225 A1 | 10/2017 | Lee et al. | |
| 2017/0359714 A1 | 12/2017 | Gupta et al. | |
| 2018/0167914 A1 | 6/2018 | Zhang et al. | |

FOREIGN PATENT DOCUMENTS

| | | |
|---|---|---|
| CN | 102742309 A | 10/2012 |
| CN | 103249116 A | 8/2013 |
| CN | 103338497 A | 10/2013 |
| CN | 104125652 A | 10/2014 |
| CN | 104519592 A | 4/2015 |
| JP | 2013526146 A | 6/2013 |
| JP | 2014512785 A | 5/2014 |
| JP | 2014525696 A | 9/2014 |
| JP | 2015501566 A | 1/2015 |
| WO | WO-2009009390 A1 | 1/2009 |
| WO | WO-2009088740 A1 | 7/2009 |
| WO | WO-2009158656 A1 | 12/2009 |
| WO | WO-2013063596 A1 | 5/2013 |
| WO | WO-2013136527 A1 | 9/2013 |
| WO | WO-2014153770 A1 | 10/2014 |
| WO | WO-2014157911 A1 | 10/2014 |
| WO | WO-2015005498 A2 | 1/2015 |
| WO | WO-2015006082 A1 | 1/2015 |
| WO | WO-2015112259 A1 | 7/2015 |
| WO | WO-2015169464 A1 | 11/2015 |

OTHER PUBLICATIONS

3GPP TR 23.703 : "3rd Generation Partnership Project; Technical Specification Group Services and System Aspects; Study on architecture enhancements to support Proximity-based Services (ProSe)", Version 1.1.0, Release 12, Jan. 2014, pp. 348.

Chuang Y-R., et al., "Study and Implementation of the Smallest Closed-Area (SCA) Mechanism for Self-Organization Network Architectures in Smart Home Control Systems," 17th International Symposium on Consumer Electronics (ISCE), Jun. 3, 2013, pp. 79-80, XP032443881, DOI: 10.1109/ISCE.2013.6570262, ISBN: 978-1-4673-6198-9, Abstract pp. 1-2, figures 2,3,4.

International Search Report and Written Opinion—PCT/US2017/024525—ISA/EPO—dated Jul. 12, 2017.

Joo S-S: "Proposed Resolution LB85 CID284~287; 15-12-0565-00-004k-proposed-resolution-lb85-cid284-287," IEEE SA Mentor; 15-12-0565-00-004k-Proposed-Resolution-LB85-CID284-287, IEEE-SA Mentor, Piscataway, NJ USA, vol. 802.15.4k, Nov. 1, 2012, pp. 1-32, XP068042362, [retrieved on Nov. 1, 2012] pp. 1-29.

Samsung: "Direct Discovery Resource Allocation", 3GPP TSG RAN WG2 Meeting #83-bis, Sep. 27, 2013, XP050718925, Retrieved from the Internet: URL:http://www.3gpp.org/ftp/tsg_ran/WG2_RL2/TSGR2_83bis/Docs/ [retrieved on Sep. 27, 2013], 3 pages.

Samsung: "Direct Discovery Resource Allocation", R2-140192, 3GPP TSG RAN WG2 Meeting #85, R2-140192, Feb. 9, 2014, XP050791595, Retrieved from the Internet: URL:http://www.3gpp.org/ftp/Meetings_3GPP_SYNC/RAN2/Docs/, 5 pages.

* cited by examiner

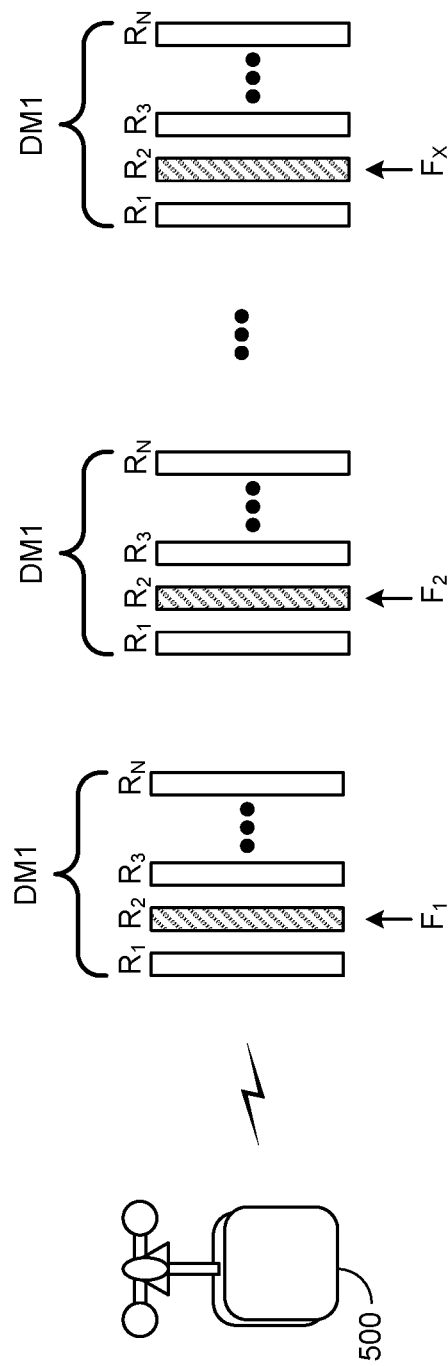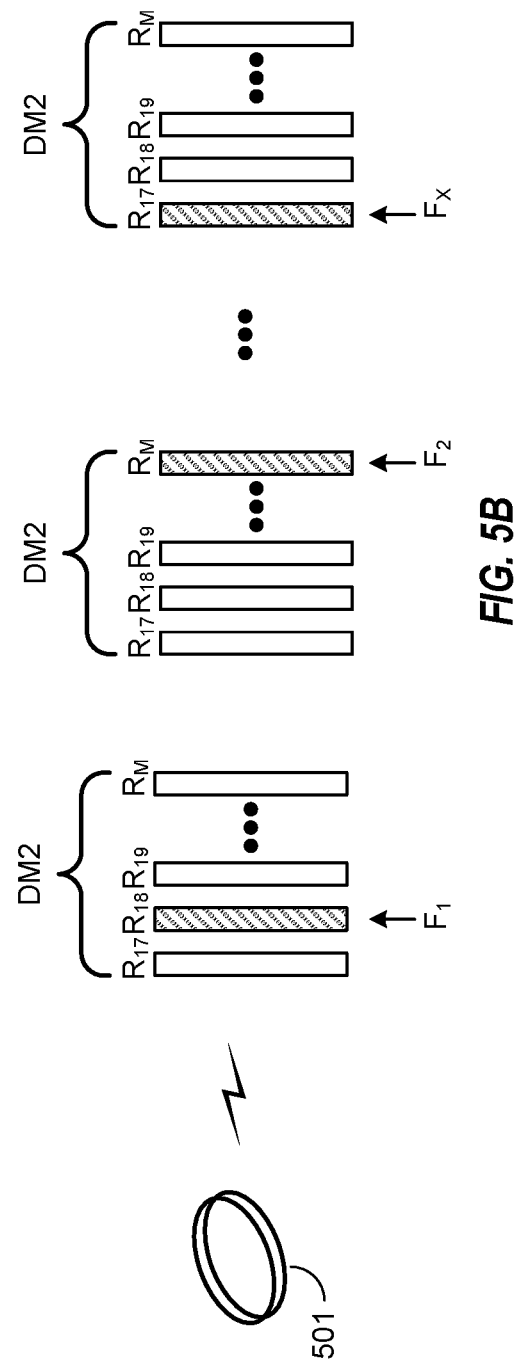
FIG. 5A
FIG. 5B

DEVICE DETECTION IN MIXED STATIC AND MOBILE DEVICE NETWORKS

CROSS-REFERENCE TO RELATED APPLICATIONS

This application is a continuation of U.S. patent application Ser. No. 15/386,114, entitled "device detection in mixed static and mobile device networks," filed on Dec. 21, 2016, now U.S. Pat. No. 10,645,631, and claims the benefit of U.S. Provisional Patent Application No. 62/347,973, entitled "device detection in mixed static and mobile device networks," filed on Jun. 9, 2016, which are expressly incorporated by reference herein in their entirety.

BACKGROUND

Field

Aspects of the present disclosure relate generally to wireless communication systems, and more particularly, to device detection in mixed static and mobile device networks.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes determining, at a wireless device, a discovery mode from a plurality of discovery modes, wherein the determining is based on a mobility state of the wireless device, identifying a set of resources associated with the determined discovery mode, wherein each of the plurality of discovery modes is provisioned with separate resources, and transmitting a discovery signal using the identified set of resources according to the discovery mode.

In an additional aspect of the disclosure, an apparatus configured for wireless communication includes means for determining, at a wireless device, a discovery mode from a plurality of discovery modes, wherein the determination is based on a mobility state of the wireless device, means for identifying a set of resources associated with the determined discovery mode, wherein each of the plurality of discovery modes is provisioned with separate resources, and means for transmitting a discovery signal using the identified set of resources according to the discovery mode.

In an additional aspect of the disclosure, a non-transitory computer-readable medium having program code recorded thereon and executed by one or more processors to perform functionality. The program code further includes code to determine, at a wireless device, a discovery mode from a plurality of discovery modes, wherein the determination is based on a mobility state of the wireless device, code to identify a set of resources associated with the determined discovery mode, wherein each of the plurality of discovery modes is provisioned with separate resources, and code to transmit a discovery signal using the identified set of resources according to the discovery mode.

In an additional aspect of the disclosure, an apparatus configured for wireless communication is disclosed. The apparatus includes at least one processor, and a memory coupled to the processor. The processor is configured to determine, at a wireless device, a discovery mode from a plurality of discovery modes, wherein the determination is based on a mobility state of the wireless device, code to identify a set of resources associated with the determined discovery mode, wherein each of the plurality of discovery modes is provisioned with separate resources, and code to transmit a discovery signal using the identified set of resources according to the discovery mode.

In an additional aspect of the disclosure, a method of wireless communication includes determining, at a wireless device, a discovery mode from a plurality of discovery modes, wherein the determining is based on a mobility state of the wireless device, identifying a set of resources associated with the determined discovery mode corresponding to a first mobility state of the wireless device, wherein each of the plurality of discovery modes is provisioned with separate resources, selecting a transmission resource of the set of resources corresponding to the wireless device in the first mobility state, performing contention resolution to reserve the transmission resource, and transmitting a discovery signal using the transmission resource.

In an additional aspect of the disclosure, an apparatus configured for wireless communication includes means for determining, at a wireless device, a discovery mode from a plurality of discovery modes, wherein the determining is based on a mobility state of the wireless device, means for identifying a set of resources associated with the determined discovery mode corresponding to a first mobility state of the wireless device, wherein each of the plurality of discovery modes is provisioned with separate resources, means for selecting a transmission resource of the set of resources corresponding to the wireless device in the first mobility state, means for performing contention resolution to reserve the transmission resource, and means for transmitting a discovery signal using the transmission resource.

In an additional aspect of the disclosure, a non-transitory computer-readable medium having program code recorded thereon and executed by one or more processors to perform functionality. The program code further includes code to determine, at a wireless device, a discovery mode from a plurality of discovery modes, wherein the determining is based on a mobility state of the wireless device, code to identify a set of resources associated with the determined discovery mode corresponding to a first mobility state of the wireless device, wherein each of the plurality of discovery modes is provisioned with separate resources, code to select a transmission resource of the set of resources corresponding to the wireless device in the first mobility state, code to perform contention resolution to reserve the transmission resource, and code to transmit a discovery signal using the transmission resource.

In an additional aspect of the disclosure, an apparatus configured for wireless communication is disclosed. The apparatus includes at least one processor, and a memory coupled to the processor. The processor is configured to determine, at a wireless device, a discovery mode from a plurality of discovery modes, wherein the determining is based on a mobility state of the wireless device, to identify a set of resources associated with the determined discovery mode corresponding to a first mobility state of the wireless device, wherein each of the plurality of discovery modes is provisioned with separate resources, to select a transmission resource of the set of resources corresponding to the wireless device in the first mobility state, to perform contention resolution to reserve the transmission resource, and code to transmit a discovery signal using the transmission resource.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 5A and 5B are block diagrams illustrating IoE devices configured according to aspects of the present disclosure.

DETAILED DESCRIPTION

Figure 1:
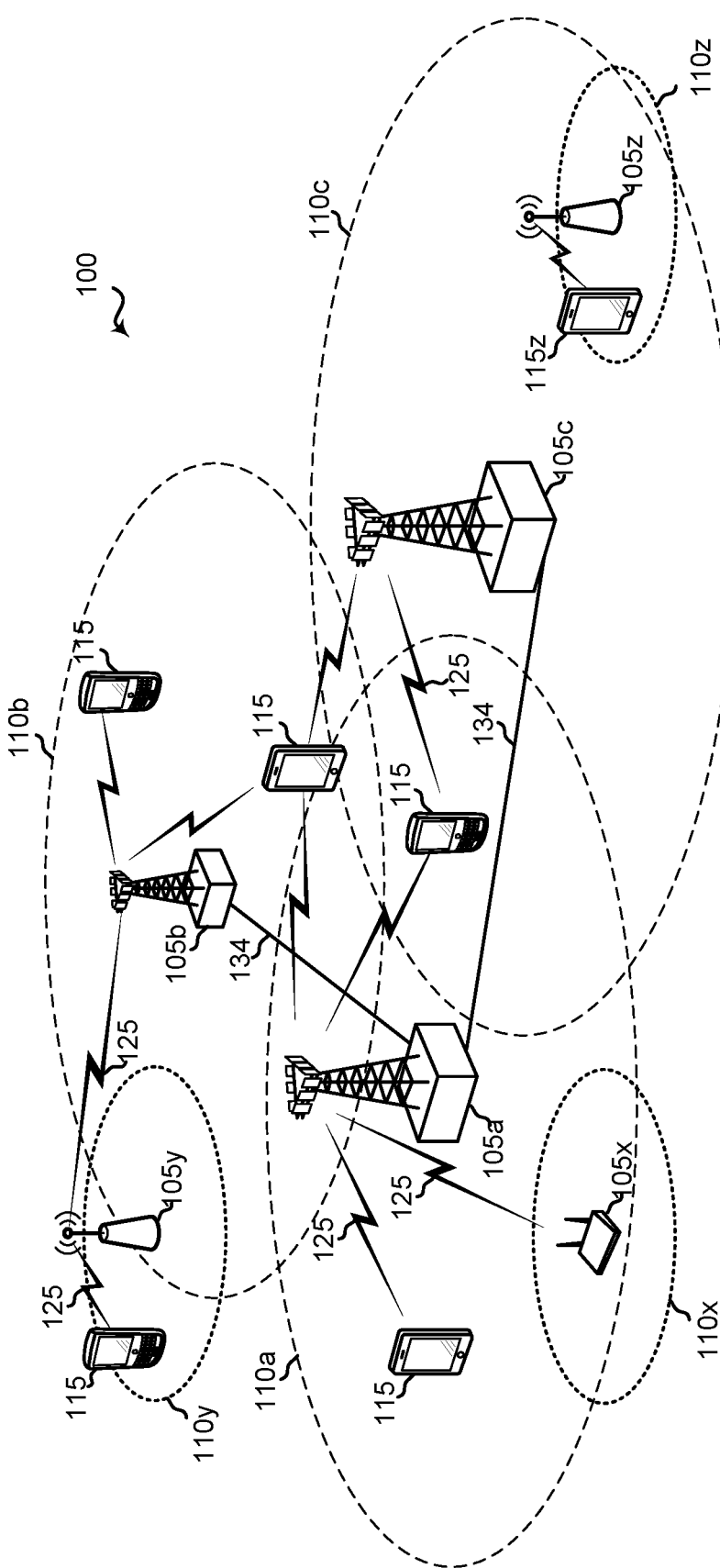
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, one or more 5G or NR networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS LTE, and NR are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. For example, 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure is concerned with shared access to wireless spectrum between networks using different radio access technologies or radio air interfaces.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or base stations.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an NR network. The wireless network 100 includes a number of base stations 105 and other network entities. A base station may be a station that communicates with the UEs and may also be referred to as an evolved node B (eNB), a node B, an access point, and the like. Each base state 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105a, 105b and 105c are macro base stations for the macro cells 110a, 110b and 110c, respectively. The base stations 105x, 105y, and 105z are small cell base stations, which may include pico or femto base stations that provide service to small cells 110x, 110y, and 110z, respectively. A base station may support one or multiple (e.g., two, three, four, and the like) cells.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. A UE may be able to communicate with macro base stations, pico base stations, femto base stations, relays, and the like. In FIG. 1, a lightning bolt (e.g., communication links 125) indicates wireless transmissions between a UE and a serving base station, which is a base station designated to serve the UE on the downlink and/or uplink, or desired transmission between base stations. Wired backhaul communication 134 indicate wired backhaul communications that may occur between base stations.

Figure 2:
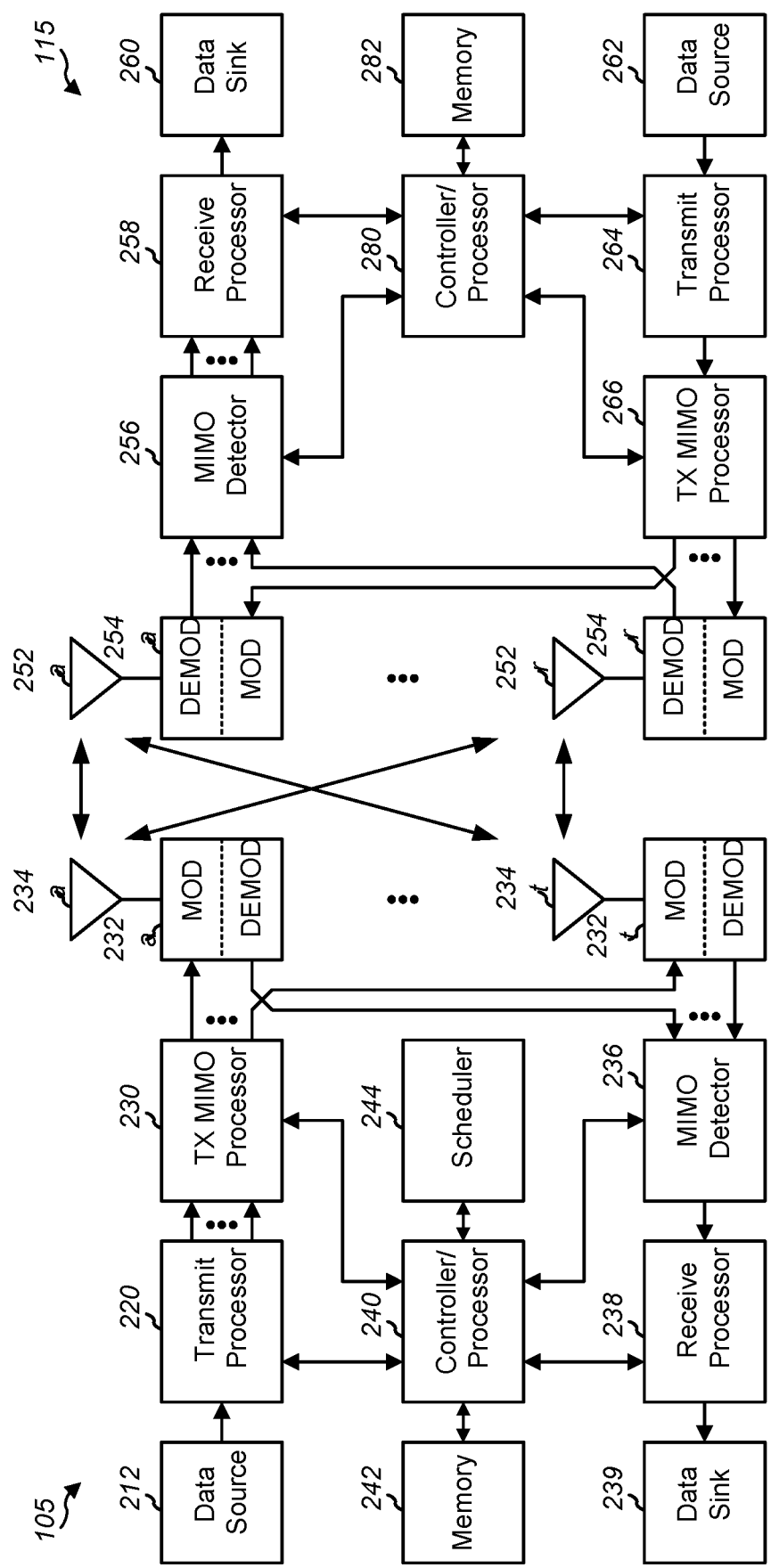
FIG. 2 is a block diagram conceptually illustrating a design of a base station/base station and a UE configured according to one aspect of the present disclosure.

FIG. 2 shows a block diagram of a design of a base station/base station 105 and a UE 115, which may be one of the base stations/base stations and one of the UEs in FIG. 1. For a restricted association scenario, the base station 105 may be the small cell base station 105z in FIG. 1, and the UE 115 may be the UE 115z, which in order to access small cell base station 105z, would be included in a list of accessible UEs for small cell base station 105z. The base station 105 may also be a base station of some other type. The base station 105 may be equipped with antennas 234a through 234t, and the UE 115 may be equipped with antennas 252a through 252r.

At the base station 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4 and 8, and/or other processes for the techniques described herein. The memories 242 and 282 may store data and program codes for the base station 105 and the UE 115, respectively. A scheduler 244 may schedule UEs for data transmission on the downlink and/or uplink.

As wireless communications continue to advance, fifth generation (5G) technologies provide for an internet of things (IoT) or internet of everything (IoE) that includes wireless connections between various enabled devices over various different wireless access technologies and wireless access networks. Instead of providing connections with a mobile device-base station paradigm, 5G IoE and IoT contemplate additional sidelink connections to establish various mesh networks where multiple mobile devices may discover and connect with each other to link remote devices, which may not have direct access to base stations or access points, to the network through the sidelink connected devices. In such sidelink mesh communications, the additional mobile device is used as a relay to the network. Multiple different scenarios for sidelink communications may be implemented, such as for public safety, proximity services, enhanced mobile broadband (eMBB) mesh networks, UE-to-network relaying, vehicle to external communications (V2X), IoE mesh networks, mission critical (MiCr) mesh networks, and the like.

In general operation, there are two types of IoE use-case scenarios: type 1—metering and sensing; and type 2—wearables, asset tracking, and logistics. In the type 1 operations, meters and sensors may essentially be static, either installed at fixed locations or semi-permanently installed with little movement. In such type of operations, the data traffic from the sensor may be light (e.g., transmitting temperature and/or humidity every hour, vehicle counts per day, or the like) and either periodic or event driven (e.g., in response to detected water leak, motion detected, or the like). Devices involved with type 1 operations may be powered with batteries with an expectation of several years of service using a single set of batteries. Therefore, expected power usage for such type 1 devices is low (e.g., 5000 mW-hr, or the like).

Type 2 operations involve devices, such as wearables, asset tracking or logistics modules, and the like. The mobility expectations of type 2 operation devices is potentially high with a data exchange of varying lengths. Some operations and applications for type 2 operation devices may require only small amounts of data, while others expect a larger amount of data. The devices involved in type 2 operations also may have different power usage expectations. While many may also be powered using batteries, those batteries may be rechargeable. Thus, the battery life expectations may be only a few days (e.g., 1500 mW-hr or the like).

Figure 3:
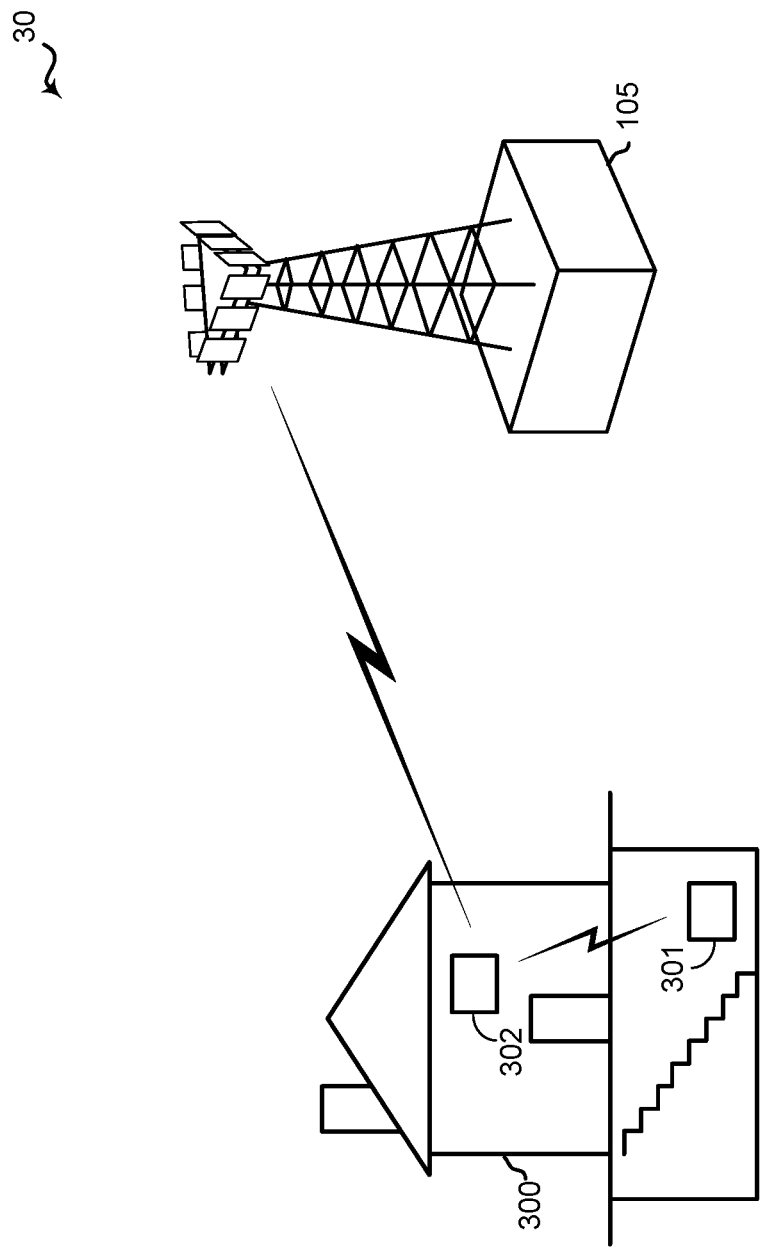
FIG. 3 is a block diagram illustrating IoE mesh wide area network (WAN).

FIG. 3 is a block diagram illustrating IoE mesh wide area network (WAN) 30. IoEs may be located in coverage-challenged locations, such as IoE device 301 located in basement of building 300. In order to relay data to the network, IoE device 301 may discover and connect with IoE device 302, which has a better location to communicate with base station 105 for network communications. In order to achieve battery-life goals, IoE devices, such as IoE devices 301 and 302, use a sleep state as often as feasible. Common awake periods may be defined, referred as "discovery periods," during which IoE devices periodically broadcast discovery signals. During these discovery periods, IoEs discover potential relay devices and their capabilities. Various traffic modes may be defined to support scheduling that is completely base station-controlled. This may, in some instances, be referred to as completely-distributed scheduling.

In order to find a suitable relay, IoE devices operate to discover other IoE devices. With numerous devices in various states of mobility from purely static to highly mobile, an efficient process may be used for discovery of IoE devices regardless of its mobility state. Various aspects of the present disclosure are directed to multiple discovery modes that may be selected based on a device mobility.

Figure 4:
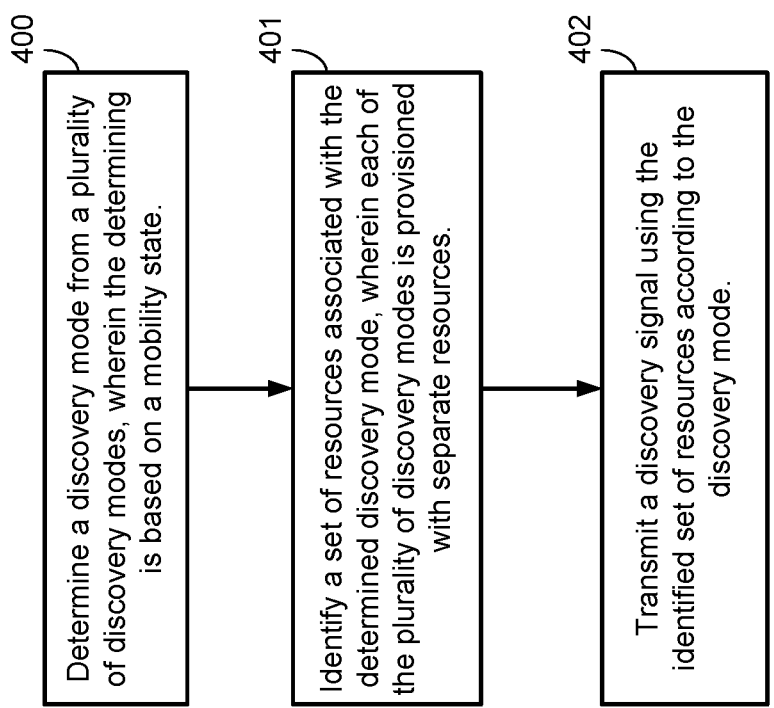
FIG. 4 is a block diagram illustrating example blocks executed to implement one aspect of the present disclosure.
Figure 9:
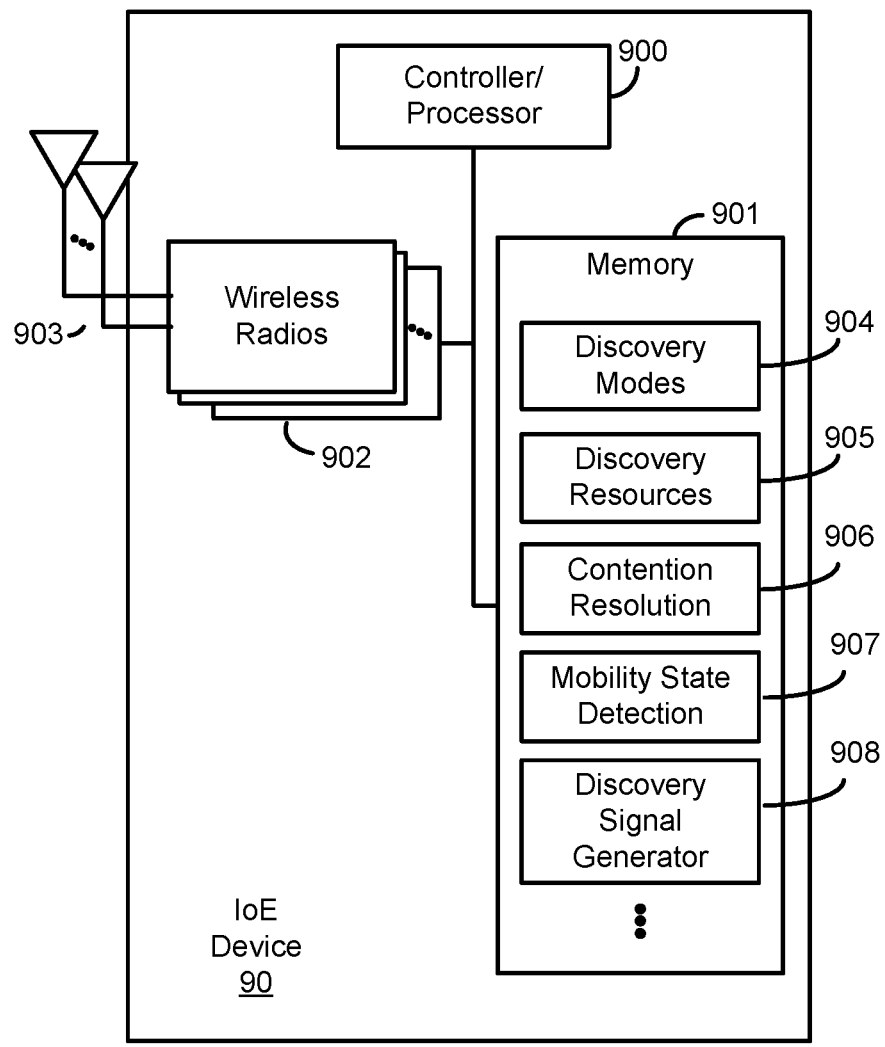
FIG. 9 is a block diagram illustrating an IoE device configured according to one aspect of the present disclosure.

FIG. 4 is a block diagram illustrating example blocks executed to implement one aspect of the present disclosure. The example blocks will also be described with respect to IoE device 90, as illustrated in FIG. 9. FIG. 9 is a block diagram illustrating IoE device 90 configured according to one aspect of the present disclosure. IoE device 90 includes the structure, hardware, and components that make up and control the operations and functionality of IoE device 90. In some aspects, IoE device 90 may include similar components, hardware, and structure as UE 115, as illustrated in FIG. 2. For example, IoE 90 includes controller/processor 900, similar to controller/processor 280, which operates to execute logic or computer instructions stored in memory 901, as well as controlling the components of IoE device 90 that provide the features and functionality of IoE device 90. IoE device 90, under control of controller/processor 900, transmits and receives signals via wireless radios 902 and antennas 903. Wireless radios 902 may includes various components and hardware, such as the components and hardware of UE 115, as illustrated in FIG. 2. For example, wireless radios 902 may include hardware similar to modulator/demodulators 254a-r, MIMO detector 256, receive processor 258, transmit processor 264, and TX MIMO processor 266.

At block 400, an IoE device determines a discovery mode from a plurality of discovery modes, wherein the discovery mode is determined based on the mobility state of the device. The plurality of discovery modes may correspond to a level of mobility. For example, for static devices that are fixed or, at least, semi-persistent, a first discovery mode or persistent mode may be defined. Devices that move very quickly, such as asset tracking devices attached to vehicles, may correspond to a second discovery mode, while devices that move more regularly than the static devices, yet less often or less quickly as the highly mobile devices may correspond to a third discovery mode. In operation, an IoE device, such as IoE device 90, under control of controller/processor 900 may execute mobility state detection logic 907, stored in memory 901, to determine its mobility state. Based on the determined mobility state, controller/processor 900 accesses discovery modes 904 to determine which of the multiple discovery modes available corresponds to the mobility state.

It should be noted that in additional aspects, IoE device 90 receives higher layer signaling from the network through antennas 903 and wireless radios 902, in which the higher layer signaling indicates which of the available discovery modes stored in discovery modes 904 should be implemented for IoE device 90.

At block 401, the IoE device identifies a set of resources associated with the determined discovery mode, wherein each of the plurality of discovery modes is provisioned with separate resources. In operation, for example, IoE device 90, having determined the discovery mode, accesses, under control of controller/processor 900, the list of discovery resources in discovery resources 905, stored in memory 901, that are associated with the determined discovery mode. The different discovery modes may be provisioned with separate resources that the IoE device will use to transmit the discovery signals.

At block 402, the IoE device transmits a discovery signal using the identified set of resources according to the determined discovery mode. For example, IoE device 90, under control of controller/processor 900, executes discovery signal generator 908, stored in memory 901, to generate the discovery signal that will be transmitted from IoE device 90 via wireless radios 902 and antennas 903. In the discovery process, the IoE devices send periodic broadcasts to enable discovery. In addition to be provisioned with separate resources, the different discovery modes may include different periodicities. In general, the more mobile an IoE device is, the more frequently it may transmit discovery signals, in order to have an efficient discovery process. Static or slow-moving devices, in contrast, may remain in range of other devices longer, thereby lessening the need for more frequent discovery signal transmissions. This approach, in turn, may allow for an efficient discovery process.

It should be noted that in certain aspects of the present disclosure, the periodicity of the more static devices may be a multiple of the periodicity of the more mobile devices. The periodicities of the discovery signals may be stored in memory 901 within discovery modes 904 and associated with the particular discovery mode. Alternatively, the periodicity may be selected based on the resulting mobility state determined through the execution environment of mobility state detection logic 907.

FIGS. 5A and 5B are block diagrams illustrating IoE devices 500 and 501 configured according to aspects of the present disclosure. IoE device 500 is a static or semi-static sensor that may be fixed in a single location over long periods of time. Because of the persistence of IoE device 500, it may use the same resource of the associated resources from discovery frame to discovery frame on a reservation-based or contention-based scheme. For example, as illustrated in FIG. 5A, IoE device 500 determines a first discovery mode (DM1) for discovery operations corresponding to static devices. The first discovery mode is associated with a set of resources, $R_1$-$R_N$. For each discovery signal, $F_1$-$F_X$, IoE device 500 will attempt to reserve and use the same resource, $R_2$.

For example, for discovery signal, $F_1$, IoE device 500 selects resource, $R_2$, from the set of resources, $R_1$-$R_N$, and performs a contention resolution on $R_2$ before transmitting discovery signal $F_1$. With the example of IoE device 90, controller/processor 900 may execute contention resolution logic 906, stored in memory 901, to perform the contention resolution and reservation procedures to reserve resource, $R_2$. Thus, IoE device 500 reserves resource $R_2$ for transmission of discovery signals according to the first discovery mode at the periodicity associated with the first discovery mode.

In one aspect, if IoE device 500 is synchronized with another IoE device (not shown) that is operating at a similar mobility state and determined discovery mode, the contention resolution performed by IoE device 500 and the other in-synch device may succeed in reserving the channel. However, this synchronization may also result in colliding discovery broadcasts. Because the first discovery mode for more static devices prompts use of the same resource from broadcast to broadcast, the colliding signals may cause unnecessary interference. In order to address this potential interference, IoE device 500 will periodically re-perform a contention resolution check of the selected resource, $R_2$. For example, for transmission of discovery signal, $F_X$, IoE device 500 re-performs the contention resolution on resource, $R_2$, before broadcasting $F_X$.

In contrast, IoE device 501 is a mobile, wearable sensor that may move at variable speeds and times. Due to these mobility parameters, IoE device 501 would determine a second discovery mode (DM2) for discovery operations. The second discovery mode is associated with a separate set of resources, $R_{17}$-$R_M$, with which IoE device 501 may send discovery signals, $F_1$-$F_X$. Because of its greater mobility, IoE device 501, using the second discovery mode, randomly selects one of the set of resources, $R_{17}$-$R_M$, for each periodic discovery signal, $F_1$-$F_X$. Thus, for each discovery frame, IoE device 501 selects a random resource to send its discovery signal, $F_1$-$F_X$. Accordingly, resource selection associated with the second discovery mode provides no memory from discovery frame to discover frame. As illustrated in FIG. 5B, IoE device 501 transmits discovery signal, $F_1$, using resource, $R_{18}$. After the periodicity associated with the second discovery mode, IoE device 501 transmits discovery signal, $F_2$, using randomly selected resource, $R_M$, and transmits discovery signal, $F_X$, using randomly selected resource, $R_{17}$, and so forth.

Figure 6:
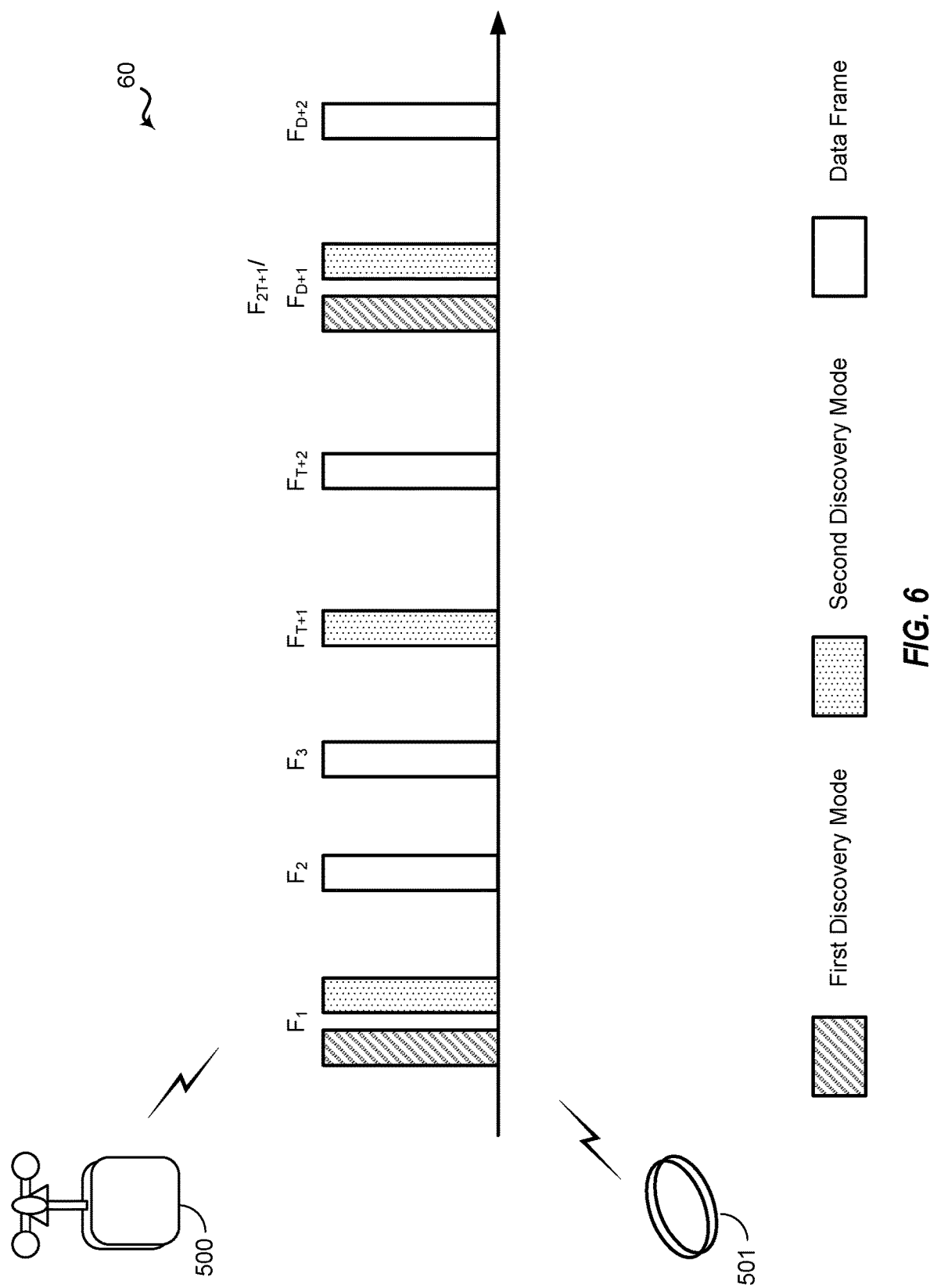
FIG. 6 is a block diagram illustrating a communication stream of IoE devices configured according to one aspect of the present disclosure.

FIG. 6 is a block diagram illustrating communication stream 60 of IoE devices 500 and 501 configured according to one aspect of the present disclosure. IoE devices 500 and 501 broadcast discovery signals according to the discovery mode determined and used by the devices. In one aspect, IoE device 500 determines that it is a more static device that may correspond to a less frequent first discovery mode, while IoE device 501 determines that it is a more mobile device that may correspond to a more frequent second discovery mode. IoE device 500 and 501 both broadcast the first discovery signal of their respective discovery modes at $F_1$. After data transmissions in data frames $F_2$-$F_3$, IoE device 501 broadcasts the next discovery signal in the next discovery frame at a periodicity of T ($F_{T+1}$). IoE devices 500 and 501 again both broadcast next discovery signals at $F_{D+1}$, which in the illustrated aspect, is the same as $F_{2T+1}$ or a multiple of the periodicity T.

Figure 7:
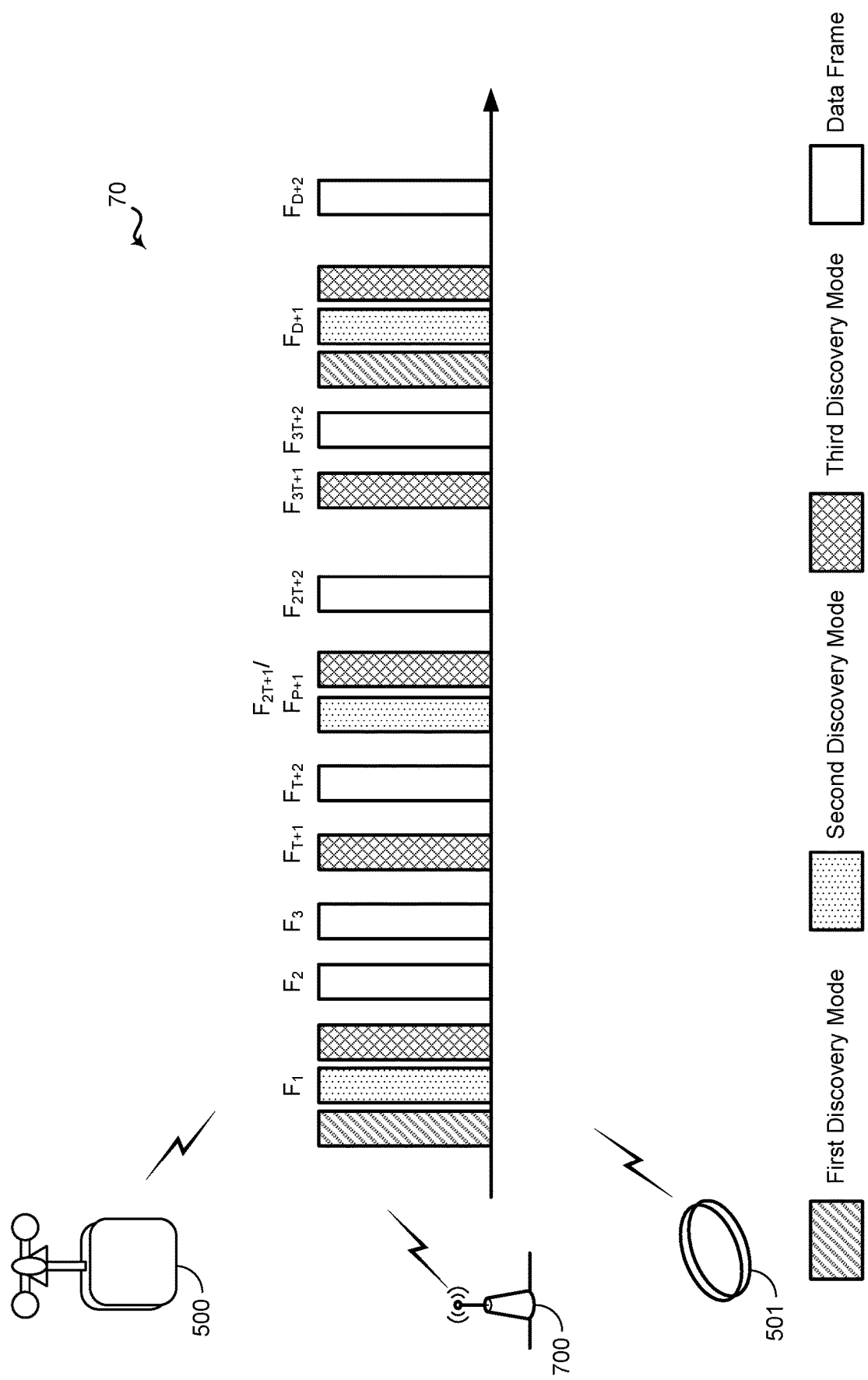
FIG. 7 is a block diagram illustrating a communication stream of IoE devices configured according to one aspect of the present disclosure.

FIG. 7 is a block diagram illustrating communication stream 70 of IoE devices 500 and 501, in addition to IoE device 700, configured according to an aspect of the present disclosure. As illustrated in FIG. 6, IoE device 500 is a static or semi-static device determined to use first discovery mode with a periodicity of D, while IoE device 501 is a semi-mobile device determined to use second discovery mode with a periodicity of P. IoE device 700 is an asset tracking device attached to a highly mobile vehicle. The speed and frequency that IoE device 700 travels prompt a determination for IoE device 700 to use the third discovery mode with a periodicity of T. Because IoE device 700 moves quickly and very often, the periodicity, T, is higher than either of periodicities P or D, as more frequency discovery broadcasts would be efficient for determining changes in the communication or location of IoE 700. Thus, IoEs 500, 501, and 700 broadcast their respective discovery signals at the associated periodicities, and transmits data in data frames, such as $F_2$, $F_3$, $F_{T+2}$, and the like.

Figure 8:
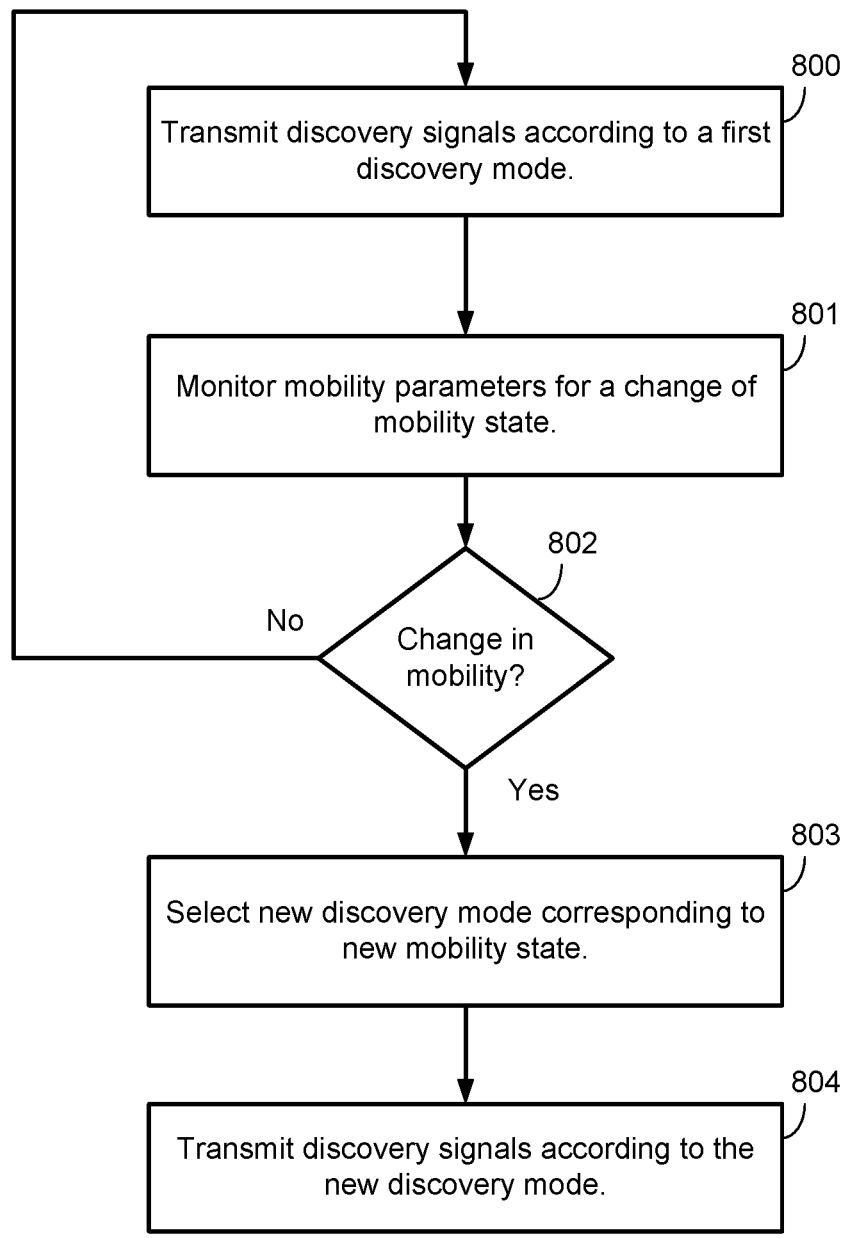
FIG. 8 is a block diagram illustrating example block executed to implement one aspect of the present disclosure.

FIG. 8 is a block diagram illustrating example block executed to implement one aspect of the present disclosure. The example blocks will also be described with respect to IoE device 90, as illustrated in FIG. 9. At block 800, an IoE device transmits discovery signals according to a first discovery mode. In additional aspects, new devices can start with the first discovery mode as either a static or mobile mode. For example, IoE device 90 executes, under control of controller/processor 900, discovery signal generator 908, which generates and transmits a discovery signal according to the determined discovery mode from discovery modes 904. The discovery signals will be transmitted via wireless radios 902 and antennas 903. Such initial mode may be standard and predefined in the read-only memory or firmware of the IoE device, such as in discovery modes 904. The initial mode may also be set by the network and transmitted to the IoE device via higher layer signaling received through antennas 903 and wireless radios 902.

At block 801, the IoE device monitors mobility parameters for a change of mobility state. For example, IoE device 90 executes, under control of controller/processor 900, mobility state detection logic 907, stored in memory 901, which monitors and detects various mobility parameters. Various means for inferring increased or decreased mobility may include, for example, inferring a lack of mobility by seeing a large fraction of the same devices in persistent discovery from frame to frame, receiving primary synchronization signal (PSS)/system information block (SIB)/master information block (MIB) from the same cell at similar strength, or receiving information from a higher layer regarding the mobility state. Conversely, by observing different devices in discovery from frame to frame, receiving PSS/SIB/MIB from different cells, and the like, the IoE device may infer increased mobility.

At block 802, a determination is made whether a change in the mobility has been detected by the IoE device. If no change in mobility state is detected, the IoE device continues using the first discovery mode as in block 800. If a change in mobility state is detected, then, at block 803, the IoE device selects a new discovery mode corresponding to the new mobility state. For example, if the first discovery mode indicated a static mode and IoE device 90 detects an increase in movement through the execution environment of mobility state detection 907, IoE device 90, under control of controller/processor 900, selects a new discovery mode from discovery modes 904 that corresponds to the higher mobility. Conversely, if the first discovery mode indicated a mobile discovery mode and IoE device 90 detects a decrease in movement, and if the decrease in movement is sufficient to cause a selection of a different discovery mode associated with a more static or less mobile operation, IoE device 90 selects the new, less mobile discovery mode from discovery modes 904. IoE device 90 begins broadcasting discovery signals via wireless radios 902 and antennas 903 at a new periodicity reflecting the change in mobility state.

For operations in 5G networks that accommodate meshed or sidelinked networks between IoE or IoT devices, a persistent discovery frame structure has been suggested. The logical structure of this suggested feature defines a discovery frame to have m slots. A device initiating a new discovery broadcast would wait for a new broadcast time (NBT) and sense for a carrier within a threshold, since there would be no legacy request to send (RTS)/clear to send (CTS) communication because of the discovery broadcast. The device next performs a random backoff, and then sends the discovery broadcast if no carrier or other usage signal is detected during backoff. In subsequent discovery frames, the device would send the discovery broadcast without the NBT delay and subsequent random backoff, assuming an implicit prioritization/reservation with a periodic contention resolution check to avoid collision deadlock for synchronized devices.

With regard to the physical structure of the suggested discovery frame, the channel dimensions may be defined using various numerologies to fit within the overall construct of the radio access network within which it is implemented. In one example implementation, the channel bandwidth of the discovery frame may be 1.15 MHz, with a subcarrier spacing of approximately 18 KHz, in order to maintain consistency. The OFDM symbol duration within the frame may be at 62.5 µs, with a CP duration of 6.94 µs, fast Fourier transform (FFT) size of 64, number of RBs at 8 with 8 tones each, and a slot duration of 2 ms or 32 symbols. The modulation and coding scheme (MCS) may be defined using quadrature phase shift keying (QPSK) at a ½ rate. The number of relays in a 2-hop neighborhood may be approximately 1000 with support for around $10^5$ devices per cell, in which approximately 10% may act as relays and approximately 10% of which operate per 2-hop neighborhood. In the discovery frame, the total number of slots may be approximately 200 (~(1000+600)/#RBs~200), in which the total duration of the discovery frame may be approximately ~400 ms.

It should be noted that the example numerology provided above is merely one example numerology for an implementation of one aspect of the present disclosure. The scope of the various aspects of the present disclosure are not, in fact, limited to this explicit numerology.

Within the discovery frame there may be a persistent discovery slot structure. A discovery slot may include a reservation and contention region, a pilot region, and a data region. Within the example numerology identified above, the discovery slot may last approximately 2 ms or 32 symbols. The reservation and contention resolution region may occur over approximately 10 symbols, comprising 2 symbols for energy detection (reservation) and 8 symbols for random backoff. With the broadcast of the discovery signals, there would be no need for the legacy RTS/CTS process, as indicated above.

According to the example numerology of the discovery frame, the pilot region may cover 2 symbols, while the data region may cover 30 symbols, which accounts for up to 240 bits for non-$1^{st}$ slot locations. The data region further may include a 64-bit address (IEEE EUI64), 12-14 parameters each averaging approximately 12 bits, and a 16-bit cyclic redundancy check (CRC). Examples of such parameters may include a sleep parameter identifying an awake duty cycle, transmit offset, and the like; an energy parameter identifying battery level, energy rate, marginal energy cost, and the like; a latency parameter identifying the number of hops to a base station, the delay, and the like, as well as association and security parameters for security, service, and billing operations.

As illustrated and described above with respect to FIGS. 1-9, various aspects of the present disclosure include a wireless device that sends periodic discovery broadcasts to enable other devices to discover the transmitting wireless device. The discovery resources used for such periodic discovery broadcasts are provisioned for different discovery modes, which may be determined or selected based on the mobility of the transmitting device. In various such aspects, the device may send discovery broadcasts at different periodic rates based on the discovery mode applied.

In a first example aspect, the wireless device may select a discovery mode based on its mobility and use the discovery resources associated with the selected mode. For example, when two modes are defined between static and mobile devices, as illustrated in FIG. 6, if the device determines itself to be static, it would use the persistent discovery resource for its broadcast, while if the device determines itself to be mobile, it will use the transient discovery broadcast resources. Otherwise, the discovery mode may be determined through higher layer signaling.

In one aspect in which the device detects its own mobility, the device may infer its mobility state through various means and monitoring of mobility parameters, such as tracking other devices it can hear discovery broadcasts from, receiving PSS/SIB/MIB from same cell at similar strength, higher layers, etc. In such aspects, the device may move from one discovery mode to another based on changes in its mobility.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4 and 8 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, at a wireless device, a discovery mode from a plurality of discovery modes based, at least in part, on a mobility state of the wireless device;
   identifying a set of resources and a discovery signal transmission periodicity for the determined discovery mode of the wireless device, wherein each of the plurality of discovery modes is provisioned with separate resources and corresponds to different discovery transmission signal periodicities;
   selecting a transmission resource from the set of resources corresponding to the determined discovery mode;
   performing contention resolution to reserve the transmission resource; and
   transmitting a discovery signal using the transmission resource and in accordance with the discovery signal transmission periodicity.

2. The method of claim 1,
   wherein identifying the set of resources includes identifying the set of resources from a list of discovery resources stored in the wireless device, and
   wherein the discovery signal is transmitted periodically in accordance with the discovery signal transmission periodicity that is different than a discovery signal transmission periodicity corresponding to a different discovery mode of the plurality of discovery modes.

3. The method of claim 1, further including:
   performing an additional contention resolution on the transmission resource after expiration of a first time from the performing the contention resolution;
   continuing transmitting the discovery signal using the transmission resource in response to the additional contention resolution being successful; and
   selecting a new transmission resource from the set of resources for the transmitting in response to detection of a collision with the additional contention resolution.

4. The method of claim 1, wherein the mobility state of the wireless device corresponds to one of: a static mobility state and a transient mobility state.

5. The method of claim 4,
   wherein the mobility state corresponds to the static mobility state, and
   wherein the selecting the transmission resource includes:
     selecting a reserved transmission resource, wherein the reserved transmission resource is reserved for the wireless device.

6. The method of claim 5, further including:
   performing an additional contention resolution on the reserved transmission resource after expiration of a first time from the performing the contention resolution; and selecting a new transmission resource from the set of resources for the transmitting only in response to the additional contention resolution being unsuccessful.

7. The method of claim 4,
wherein the mobility state corresponds to the transient mobility state, and
wherein the selecting the transmission resource includes:
randomly selecting the transmission resource from the set of resources.

8. The method of claim 7, further including:
randomly selecting an additional transmission resource from the set of resources after expiration of a first time from the performing the contention resolution;
performing an additional contention resolution on the additional transmission resource; and
continuing transmitting the discovery signal using the additional transmission resource in response to the additional contention resolution being successful.

9. The method of claim 8, further including:
randomly selecting a new transmission resource from the set of resources for the transmitting in response to the additional transmission resource being unsuccessful.

10. The method of claim 1, further including:
initiating a first discovery mode by the wireless device, wherein the first discovery mode is a default mode for the wireless device; and
detecting one or more conditions of the wireless device, wherein the one or more conditions correspond to the mobility state of the wireless device, wherein the determining the discovery mode is in response to the detected one or more conditions associated with the mobility state, wherein the first discovery mode is different from the determined discovery mode.

11. The method of claim 10, wherein the detecting the one or more conditions includes one or more of:
detecting discovery broadcast signals for a same set of devices over a plurality of discovery frames;
detecting the discovery broadcast signals for a different set of devices over the plurality of discovery frames;
receiving one or more broadcast signals from the same set of devices at a similar signal strength;
receiving the one or more broadcast signals from the same set of devices at a dynamically changing signal strength;
receiving the one or more broadcast signals from the different set of devices; and/or
detecting a change in location from one or more location sensors of the wireless device.

12. The method of claim 10, wherein the first discovery mode is received via higher layer signaling.

13. The method of claim 1, wherein the determining the discovery mode includes:
receiving a configuration signal via higher layer signaling, wherein the configuration signal identifies the discovery mode for the wireless device.

14. The method of claim 1, wherein selecting the transmission resource from the set of resources corresponding to the determined discovery mode comprises randomly selecting the transmission resource from the set of resources based on the determined discovery mode corresponding to a transient mobility mode.

15. An apparatus configured for wireless communication, comprising:
means for determining, at a wireless device, a discovery mode from a plurality of discovery modes based, at least in part, on a mobility state of the wireless device;
means for identifying a set of resources and a discovery signal transmission periodicity assigned to the determined discovery mode of the wireless device, wherein each of the plurality of discovery modes is provisioned with separate resources and corresponds to different discovery transmission signal periodicities;
means for selecting a transmission resource from the set of resources corresponding to the determined discovery mode;
means for performing contention resolution to reserve the transmission resource; and
means for transmitting a discovery signal using the transmission resource and in accordance with the discovery signal transmission periodicity.

16. The apparatus of claim 15,
wherein the means for identifying the set of resources includes means for identifying the set of resources from a list of discovery resources stored in the wireless device, and
wherein the discovery signal is transmitted periodically in accordance with the discovery signal transmission periodicity that is different than a discovery signal transmission periodicity corresponding to a different discovery mode of the plurality of discovery modes.

17. A non-transitory computer-readable medium having program code recorded thereon, the program code comprising:
program code executable by a computer for causing the computer to determine a discovery mode from a plurality of discovery modes based, at least in part, on a mobility state of a wireless device;
program code executable by the computer for causing the computer to identify a set of resources and a discovery signal transmission periodicity for the determined discovery mode of the wireless device, wherein each of the plurality of discovery modes is provisioned with separate resources and corresponds to different discovery transmission signal periodicities;
program code executable by the computer for causing the computer to select a transmission resource from the set of resources corresponding to the determined discovery mode;
program code executable by the computer for causing the computer to perform contention resolution to reserve the transmission resource; and
program code executable by the computer for causing the computer to transmit a discovery signal using the transmission resource and in accordance with the discovery signal transmission periodicity.

18. The non-transitory computer-readable medium of claim 17,
wherein the program code executable by the computer for causing the computer to identify the set of resources includes program code executable by the computer for causing the computer to identify the set of resources from a list of discovery resources stored in the wireless device, and
wherein the discovery signal is transmitted periodically in accordance with the discovery signal transmission periodicity that is different than a discovery signal transmission periodicity corresponding to a different discovery mode of the plurality of discovery modes.

19. An apparatus configured for wireless communication, the apparatus comprising:
at least one processor; and
a memory coupled to the at least one processor,
wherein the at least one processor is configured:

to determine, at a wireless device, a discovery mode from a plurality of discovery modes based, at least in part, on a mobility state of the wireless device;

to identify a set of resources and a discovery signal transmission periodicity for the determined discovery mode of the wireless device, wherein each of the plurality of discovery modes is provisioned with separate resources and corresponds to different discovery transmission signal periodicities;

to select a transmission resource from the set of resources corresponding to the determined discovery mode;

to perform contention resolution to reserve the transmission resource; and to transmit a discovery signal using the transmission resource and in accordance with the discovery signal transmission periodicity.

20. The apparatus of claim 19, wherein the at least one processor is further configured:

to perform an additional contention resolution on the transmission resource after expiration of a first time from performance of the contention resolution;

to continue transmission of the discovery signal using the transmission resource in response to the additional contention resolution being successful; and to select a new transmission resource from the set of resources for transmission in response to detection of a collision with the additional contention resolution.

21. The apparatus of claim 19, wherein the mobility state of the wireless device corresponds to one of: a static mobility state and a transient mobility state.

22. The apparatus of claim 21, wherein the mobility state corresponds to the static mobility state, and wherein of the at least one processor is configured to select the transmission resource by selecting a reserved transmission resource, wherein the reserved transmission resource is reserved for the wireless device.

23. The apparatus of claim 22, wherein the at least one processor is further configured:

to perform an additional contention resolution on the reserved transmission resource after expiration of a first time from the performing the contention resolution; and to select a new transmission resource from the set of resources for transmission only in response to the additional contention resolution being unsuccessful.

24. The apparatus of claim 21, wherein the mobility state corresponds to the transient mobility state, and wherein of the at least one processor is configured to select the transmission resource by randomly selecting the transmission resource from the set of resources.

25. The apparatus of claim 24, wherein the at least one processor is further configured:

to randomly select an additional transmission resource from the set of resources after expiration of a first time from performance of the contention resolution;

to perform an additional contention resolution on the additional transmission resource; and to continue transmission of the discovery signal using the additional transmission resource in response to the additional contention resolution being successful.

26. The apparatus of claim 25, wherein the at least one processor is further configured to randomly select a new transmission resource from the set of resources in response to the additional transmission resource being unsuccessful.

27. The apparatus of claim 19, wherein the at least one processor is further configured:

to initiate a first discovery mode by the wireless device, wherein the first discovery mode is a default mode for the wireless device; and to detect one or more conditions of the wireless device, wherein the one or more conditions correspond to the mobility state of the wireless device, wherein a determination of the discovery mode is executed in response to the detected one or more conditions associated with the mobility state, and wherein the first discovery mode is different from the determined discovery mode.

28. The apparatus of claim 27, wherein the at least one processor is configured to detect the one or more conditions by configuration of the at least one processor to one or more of:

detect discovery broadcast signals for a same set of devices over a plurality of discovery frames;

detect the discovery broadcast signals for a different set of devices over the plurality of discovery frames;

receive one or more broadcast signals from the same set of devices at a similar signal strength;

receive the one or more broadcast signals from the same set of devices at a dynamically changing signal strength;

receive the one or more broadcast signals from the different set of devices; and/or detect a change in location from one or more location sensors of the wireless device.

29. The apparatus of claim 27, wherein the first discovery mode is received via higher layer signaling.

30. The apparatus of claim 19, wherein the at least one processor is configured to determine the discovery mode by receiving a configuration signal via higher layer signaling, and wherein the configuration signal identifies the discovery mode for the wireless device.

* * * * *